Sept. 22, 1931.  R. O. J. JENSEN  1,824,353
SCREEN FOR SHOWING PROJECTED IMAGES IN LIGHTED ROOMS AND
FOR SHORT EXPOSURE PHOTOGRAPHY
Filed Dec. 1, 1927
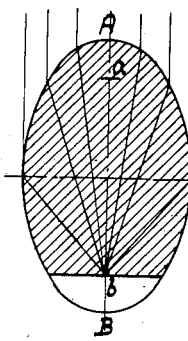
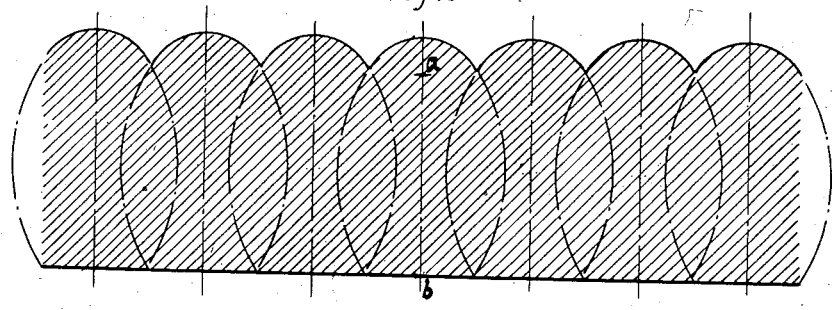
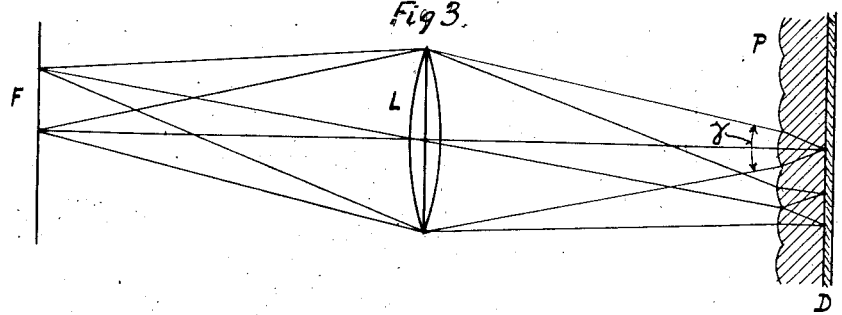
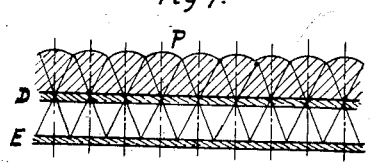
Inventor
R. O. J. Jensen,
By Watson, Coit,
Morse & Grindle
Att'ys Patented Sept. 22, 1931

1,824,353

UNITED STATES PATENT OFFICE

RASMUS OLAF JONAS JENSEN, OF COPENHAGEN, DENMARK

SCREEN FOR SHOWING PROJECTED IMAGES IN LIGHTED ROOMS AND FOR SHORT-EXPOSURE PHOTOGRAPHY

Application filed December 1, 1927, Serial No. 237,092, and in Denmark December 15, 1926.

The present invention relates to a screen for showing projection images in lighted rooms and for short-exposure photography.

In ordinary projection of lantern views on a white screen the room in which the screen is situated must be dark, since blackness can only be produced by lack of light.

If the screen is black, and is fitted with a large number of small holes, and light is directed through the latter from behind, the screen will appear more or less lighted depending on the quantity of light passing through the holes, provided that the observer is placed at such a large distance from the screen that the individual holes cannot be discerned from each other. An image projected from behind will thus be visible on the opposite side.

Too much light would be lost, however, since the aggregate area of the holes is very small in comparison with the total screen area, but if the light is condensed at each hole by means of especially shaped refractive bodies, then all the light received by the screen may be caused to pass through the holes.

A projected image will therefore be visible on the black screen, even if the latter be lighted on the side facing the spectator, provided that the reflectiveness of the screen is very small.

For teaching and advertising it will be of great importance that the image may be seen at daylight and in a lighted room. The method is also well adapted to replace viewfinders using ground glass, in as much as the harmful effect of reflected light is thereby avoided.

In cinematograph theatres the blackness of the screen is a further advantage, as the room cannot be absolutely dark, and consequently some light will reach the screen by reflection from walls and ceiling, which will flatten the image when the screen is white.

The method is also well adapted to reduce the time of exposure in photography, since all the light reaching the plate is concentrated on to small surfaces where, consequently, the intensity of light is very high.

In the following there will be described the manner of action and various constructions of the above mentioned screen which is diagrammatically represented in the drawings, in which:

Figure 1 is a section through an optical element illustrating the principle of the invention;

Figure 2 is a sectional view showing one form of the invention embodying the use of a multiplicity of optical elements such as are disclosed in Fig. 1;

Figure 3 is a diagrammatic view illustrating the use of the invention in reducing the time of exposure of a sensitized protographic plate; and Figure 4 is a sectional view illustrating one manner of reproducing the image formed on the sensitized plate.

If parallel rays of light strike an ellipsoid of rotation of glass with focal points $a$ and $b$ in such a manner that the rays of light are parallel to the axis of rotation A—B, then the refractive index of the glass and the shape of the ellipsoid may be so chosen that all rays will meet in one point, namely the one focus $b$.

If the portion of the ellipsoid situated between the focus $b$ and the apex B is removed, so that the shaded portion remains, then the light will pass out at the point $b$, and if a piece of photographic copying paper is placed on the plane surface, this paper will only be actuated by the light at the point $b$. The entire surface may be covered with an opaque coating when only a hole is left in the same at $b$, and all the light will nevertheless pass out.

If a large number of such truncated ellipsoids are placed side by side, and the small interstices between the same are filled out, then the light will pass out by way of the points $b$.

Instead of the many ellipsoids placed side by side a glass plate may be made the surface of which consists of ellipsoid segments in close proximity to each other, the other face of the plate being plane and passing through all the focal points $b$ corresponding to the segments as shown in Fig. 2 where the imaginary ellipsoids are shown dotted.

If the ellipsoid segments are hit by rays of light forming small angles with each other and with the axis A—B, the light will be collected on to surfaces which are very small, however, relatively to the entire surface, unless the angle be particularly large. The plane side of the plate may therefore be coated with a dark opaque layer with small holes at all the focuses $b$. If the black layer is dull, so that it is only slightly reflecting, then the plate will have the appearance of a uniformly black surface, even when lighted from the side where the observer is standing.

The segments may also be of other shape, they may for instance be parts of spheres or rods of circular, elliptic or other cross-section.

In Fig. 3 F is the image which is projected on the plate P by means of the lens L. If the apex angle $j$ is small, the light will be concentrated in small spots on the plane side of the plate. Since the plate itself is dark, it will appear more or less bright depending on the quantity of light passing through.

The image will thus appear on the opposite side which must be turned towards the spectators.

In order that the individual small surfaces may not be distinguished separately by the eye, the plate should be observed at a distance being about 3000 times as large as the distance centre to centre of the surfaces.

The plate should preferably be made thinner towards the outer edges than at centre.

The parts which are not coated will reflect light. In order to prevent this and to prevent refractive phenomena the plate may here be etched slightly, so that its surface becomes dull.

Such a plate will also allow short-exposure photography even with a small diaphragm.

If in fact the plate is placed against the side of the photographic plate D facing the lens, in such a manner that the plane side directly touches the photographic plate, then the light will be concentrated on to the small surfaces at $b$, whereby the light acts much more intensively than if it were distributed over the entire surface.

After being developed and fixed the negative is again placed on the plate, in such a manner that each of the blackened spots comes close to one of the points $b$ as shown on Fig. 4.

The copying paper E must be placed at some distance from the negative, in order that the light passing through the glass plate and the negative may be distributed over the paper.

Having now particularly described and ascertained the nature of my said invention and in what manner the same is to be performed, I declare that what I claim is:—

1. A device for casting an image comprising a member of light refracting material having one surface thereof formed to present a multiplicity of lenticular elements to the image source, each of said elements being constructed and arranged to focus the light received thereby on the opposite surface of the member, the last mentioned surface being translucent at those points which constitute the foci of the elements, and being opaque and light absorbent at all other points thereon.

2. In apparatus of the class described, the combination with an opaque apertured screen, of means for receiving light from a source and projecting the same on the screen, said means comprising a plurality of co-planar optical devices, each of said devices being so disposed that the focal point thereof coincides with one of the screen apertures.

In testimony whereof he affixes his signature.

RASMUS OLAF JONAS JENSEN.